Dec. 15, 1970 W. O. BERRY 3,548,341
HIGH FREQUENCY SWEEP GENERATOR USING SEQUENTIALLY SWITCHED FREQUENCY MULTIPLIER STAGES
Filed July 26, 1968
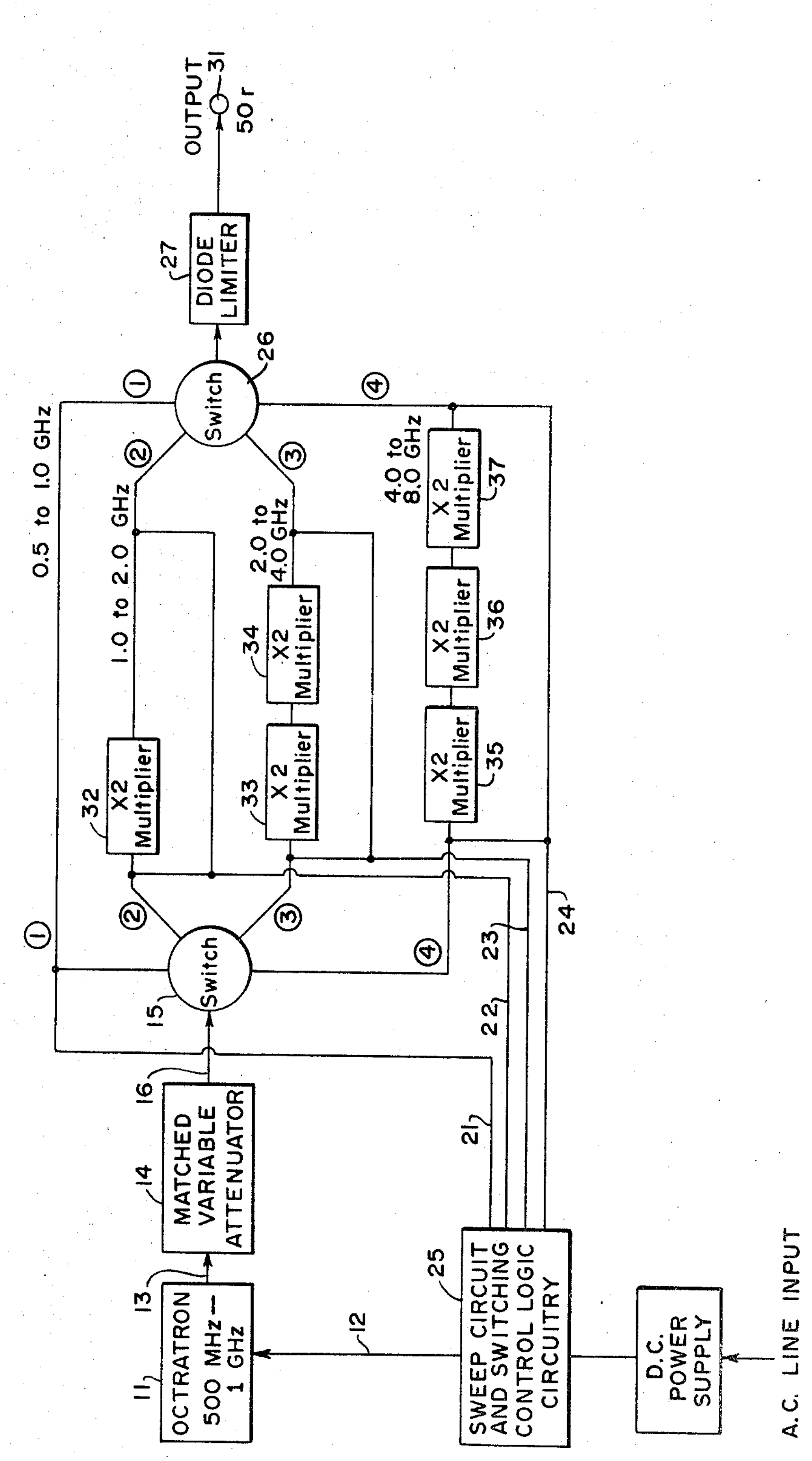
INVENTOR.
WILLIAM O. BERRY
BY
Wolf, Greenfield & Hieken
ATTORNEYS United States Patent Office 3,548,341

Patented Dec. 15, 1970

3,548,341

HIGH FREQUENCY SWEEP GENERATOR USING SEQUENTIALLY SWITCHED FREQUENCY MULTIPLIER STAGES

William O. Berry, North Chelmsford, Mass., assignor to Alpha Industries, Inc., Newton Upper Falls, Mass., a corporation of Delaware Filed July 26, 1968, Ser. No. 748,009
Int. Cl. H03b *23/00*
U.S. Cl. 331—178 3 Claims

ABSTRACT OF THE DISCLOSURE

A high frequency signal source is swept over a predetermined frequency range, such as 0.5–1.0 gHz, during a contiguous sequence of time intervals. Multipliers couple the swept R-F signal to an output terminal while changing the frequency multiplication factor as the interval in the sequence changes. This multiplication factor is typically 1, 2, 4 and 8 during respective ones of first, second, third and fourth time intervals of a sequence to provide a swept frequency output on the output terminal from 0.5 gHz. to 8.0 gHz. The change in multiplication factor is preferably accomplished with multiple pole solid state switches.

BACKGROUND OF THE INVENTION

The present invention relates in general to high frequency sweep signal generating and more particularly concerns a novel very high frequency sweep signal generator for providing a continuously swept signal over an exceptionally wide range of UHF and microwave frequencies. Apparatus embodying the invention accomplishes these results electronically with solid state components in a reliable efficient manner.

Sweep signal generators are widely used for determining frequency response characteristics of wideband electrical circuits to facilitate their rapid checking and/or alignment. Typical existing microwave frequency signal sources are capable of producing only octave bandwidth microwave signals. To achieve greater bandwidth several of these octave bandwidth generators and their associated power supplies and circuitry are combined, either by a multiband multiplex, or mechanical switches for band switching. The use of multiplexers for achieving this broad bandwidth has a number of disadvantages. The multiple of octave bandwidth generators must cover the entire frequency range. Each generator usually requires its own power supply and associated circuitry, thereby requiring a large power drain, large volume, large physical size and high cost. Typical systems use large expensive backward wave oscillator tubes.

Accordingly, it is an important object of this invention to overcome one or more of the disadvantages set forth above and provide a wideband microwave signal source.

It is a further object of this invention to provide a single high frequency signal source capable of generating signals over a multiplicity of octaves in a frequency range embracing microwave frequencies.

It is a further object of the invention to achieve one or more of the preceding objects while repetitively sweeping the output frequency.

It is a further object of the invention to achieve one or more of the preceding objects with a low cost compact light-weight unit.

It is a further object of the invention to achieve one or more of the preceding objects through techniques facilitating easy maintenance of oscillation while providing an acceptable output signal level over the desired multiple octave frequency range.

SUMMARY OF THE INVENTION

According to the invention, there is a variable frequency source including means for adjusting the frequency of its output signal to any value between predetermined limit frequencies embracing a first frequency range, an output terminal, a plurality of frequency multiplying means, and switching means for intercoupling the variable frequency source with the output terminal through means including a selected one of the frequency multiplier means. Preferably, the frequency range between the first and second limit frequencies multiplied by each of the multiplication factors of a respective frequency multiplier defines a sequence of contiguous frequency ranges typically commencing at the lowermost limit frequency and ending at the higher limit frequency multiplied by the highest multiplying factor. Typical multiplication factors are 1, 2, 4 and 8 utilizing an octave source to provide a sweep range of four octaves. The variable frequency source is preferably an octratron and the switching means preferably comprises multiple pole semiconductor switching means.

Numerous other features, objects and advantages of the invention will become apparent from the following specification when read in connection with the accompanying drawing.

BRIEF DESCRIPTION OF THE DRAWING

The single figure of the drawing is a block diagram illustrating the logical arrangement of a system according to the invention.

DETAILED DESCRIPTION OF THE PREFERRED EMBODIMENTS

With reference now to the drawing, an octratron 11 functions as a variable frequency signal source providing an R-F signal between a lower limit frequency of 0.5 gHz. and an upper limit frequency of 1.0 gHz. that is continuously variable across that 0.5 gHz. band and proportional to the sweep voltage applied on line 12. Preferably the power output is at least 500 milliwatts. The output of octratron 11 on line 13 is applied to matched variable attenuator 14 that comprises means for adjusting the output power delivered to single-pole four-throw diode switch 15, typically a type MO–2952 switch available from Alpha Industries, Inc. Matched variable attenuator 14 may also include means for receiving a modulating signal to provide square, pulse or sine wave modulation. The output of matched variable attenuator 14 on line 16 is applied to the input arm of diode switch 15 having four output arms designated 1, 2, 3 and 4 each of which receives biasing signals on lines 21, 22, 23 and 24 of sweep and switching control logic circuitry 25 to sequentially bias the four output arms on during respective contiguous sweep intervals of octratron 11. Simultaneously, input arms 1, 2, 3 and 4 of output switch 26 are on when output arms 1, 2, 3 and 4, respectively, of input switch 15 are on.

When arms 1 are biased on, the path from line 16 through switch 15 and output switch 26 carries the 0.5 to 1.0 gHz. range of frequencies through diode limiter 27 to output terminal 31. During the next sweep interval when arms 2 are on, the output on line 16 is transmitted through frequency doubler 32, typically an octave bandwidth varactor multiplier so that the frequency range of signals applied to input arm 2 of output switch 26 is within the frequency range of 1.0 to 2.0 gHz. and transmitted through diode limiter 27 to output terminal 31. During the third sweep interval the signal on line 16 is coupled from output arm 3 of input switch 15 through frequency doublers 33 and 34 cascaded to provide on input arm 3 of output switch 26 signals within the frequency range of 2.0 to 4.0 gHz. through diode limiter 27 to output terminal 31. During the fourth sweep interval the output signal on line 16 is coupled through input switch 15 from output arm 4 through frequency doublers 35, 36 and 37 to provide on input arm 4 of output switch 26 a signal within the frequency range of 4.0 to 8.0 gHz. through diode limiter 27 to output terminal 31.

Diode limiter 27 may function to attenuate the higher power lower frequency signals but not the lower power higher frequency signals so that the output over the frequency range may remain substantially constant and be of the order of 0.25 milliwatt for an efficiency of 10% for each of the multipliers and a loss of 1.5 db through each of diode switches 15 and 26. By adding an octave bandwidth amplifier at the input of input switch 15 or using a higher power octratron, higher output power levels may be provided. A suitable diode limiter 27 may comprise a varactor diode.

The specific sweep and switching control logic circuitry may be of conventional type well known in the art. For example, the switching control logic circuitry could comprise a two-stage binary counter and suitable diode matrix with the counter changing its state in response to the completion of each sweep interval and assuming four different states sequentially that are sensed by the diode matrix in a well known manner to bias the lines 1, 2, 3 and 4 on in corresponding sequence.

The specific invention described thus affords a completely solid state extremely broadband leveled output that may produce R-F signals over an exceptionally wide band of UHF and microwave frequencies in a single compact lightweight unit.

Numerous variations may be practiced by those skilled in the art within the principles of the invention. For example, if less than full octave bandwidth multipliers are employed, the sweep voltage applied to the octratron may be changed slightly during each sweep interval to achieve a desired degree of contiguity while avoiding spurious effects caused by harmonics on the edge of the bands. Different variable frequency sources and different switching means may be employed within the principles of the invention. It is evident that those skilled in the art may now make numerous modifications and uses of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

I claim:

1. High frequency apparatus comprising, a source of a variable frequency signal controllable to any frequency between a lower limit frequency and an upper limit frequency, means for controlling the frequency of said variable frequency source, an output terminal, first means defining a first path between said variable frequency signal source and said output terminal for multiplying said variable frequency by a predetermined first factor to provide a first signal on said output terminal of frequency corresponding to that provided by said variable frequency source multiplied by said first factor, and at least one other means defining at least one other path between said variable frequency signal source and said output terminal for multiplying said variable frequency by at least one other factor to provide at least one other signal on said output terminal of frequency corresponding to that provided by said variable frequency source multiplied by said at least one other factor, selecting means for selecting respective ones of said paths between said variable frequency signal source and said output terminal during mutually exclusive time intervals, means for applying a sweep signal to said variable frequency signal source to vary the frequency thereof between said upper and lower limit frequencies, and means for changing from one of said paths to another of said paths in predetermined sequence upon completion of each of the sweep intervals.

2. High frequency apparatus in accordance with claim 1 wherein the frequency range corresponding to that between said lower and upper limit frequencies multipled by said first factor is substantially contiguous with the frequency range of said lower and upper limit frequencies multiplied by said at least one other factor.

3. High frequency apparatus in accordance with claim 1 wherein said selecting means comprises multiple-throw input switching means having a plurality of outputs and an input and multiple throw output switching means having a like plurality of inputs and an output coupled to said output terminal, one of said input switching means output arms and a corresponding one of said output switching means input arms comprising said means defining said first path, another of said input switching means output arms and a corresponding another of said output switching means input arms comprising said at least one other means defining said at least one other path.

References Cited

UNITED STATES PATENTS

| | | | |
|---|---|---|---|
| 2,354,800 | 8/1944 | Deal | 331—53X |
| 2,912,652 | 11/1959 | Dorney et al. | 331—178X |

ROY LAKE, Primary Examiner

S. H. GRIMM, Assistant Examiner

U.S. Cl. X.R.

321—61; 331—76, 179